US012089545B1

(12) United States Patent
Kalayjian et al.

(10) Patent No.: US 12,089,545 B1
(45) Date of Patent: Sep. 17, 2024

(54) GROW TOWERS WITH OVERLAPPING FUNNELS FOR AUTOMATED AGRICULTURE PRODUCTION

(71) Applicant: MJNN LLC, South San Francisco, CA (US)

(72) Inventors: Nicholas Kalayjian, San Carlos, CA (US); Paul Bryan Kreiner, Menlo Park, CA (US); Matthew James Matera, San Francisco, CA (US); Gage Goodspeed Coffin, Los Altos Hills, CA (US); Frank Spiteri, Palo Alto, CA (US)

(73) Assignee: MJNN LLC, South San Francisco, CA (US)

( * ) Notice: Subject to any disclaimer, the term of this patent is extended or adjusted under 35 U.S.C. 154(b) by 469 days.

(21) Appl. No.: 17/484,251

(22) Filed: Sep. 24, 2021

Related U.S. Application Data

(60) Provisional application No. 63/083,753, filed on Sep. 25, 2020.

(51) Int. Cl.
*A01G 31/04* (2006.01)
(52) U.S. Cl.
CPC .................. *A01G 31/042* (2013.01)
(58) Field of Classification Search
CPC ...... A01G 9/0299; B67C 11/02; B65G 17/36; B65G 17/126
USPC .............. 141/338; 53/570; 198/708
See application file for complete search history.

(56) References Cited

U.S. PATENT DOCUMENTS

| | | | | |
|---|---|---|---|---|
| 262,376 A * | 8/1882 | Crehore | ................ | B65G 47/58 198/708 |
| 329,862 A * | 11/1885 | Stephens | ................... | B03B 5/08 198/708 |
| 637,716 A * | 11/1899 | Dodge | ...................... | B65B 5/08 198/708 |
| 968,795 A * | 8/1910 | Peck | ...................... | B65G 17/36 198/708 |
| 1,026,385 A * | 5/1912 | Dull | ...................... | B65G 17/36 198/706 |
| 2,024,894 A * | 12/1935 | Taylor | ..................... | E02F 3/141 37/339 |
| 2,077,306 A * | 4/1937 | Sylvan | ................... | B67C 11/02 141/340 |
| 2,083,788 A * | 6/1937 | Loeber | ................... | B67C 11/02 81/3.4 |
| 2,244,677 A | 6/1941 | Cornell | | |
| 2,935,200 A * | 5/1960 | Lutz | ...................... | B01D 35/00 210/216 |
| 3,254,448 A | 6/1966 | Othmar | | |

(Continued)

FOREIGN PATENT DOCUMENTS

CN 206486930 U * 9/2017
EP 0610137 A1 8/1994
(Continued)

OTHER PUBLICATIONS

Merged translation of CN_206486930 (Year: 2017).*

*Primary Examiner* — Morgan T Jordan
(74) *Attorney, Agent, or Firm* — Almanac IP Advisors LLP

(57) ABSTRACT

A controlled environment agriculture system that operates in connection with grow towers having overlapping funnels. The use of overlapping funnels functionally de-couples irrigation processes from tower conveyance.

6 Claims, 7 Drawing Sheets

(56) References Cited

U.S. PATENT DOCUMENTS

| | | | |
|---|---|---|---|
| 3,425,158 A * | 2/1969 | Kyle | A01G 31/042 |
| | | | 226/170 |
| 3,704,774 A * | 12/1972 | Van der Winden | A23L 3/001 |
| | | | 198/708 |
| 3,719,327 A | 3/1973 | McMahan | |
| 3,737,025 A * | 6/1973 | Miller | B65G 17/36 |
| | | | 198/708 |
| 3,842,967 A * | 10/1974 | Davis | B65G 17/126 |
| | | | 198/708 |
| 4,075,785 A | 2/1978 | Jones | |
| 4,137,689 A * | 2/1979 | McClusky | B65B 25/04 |
| | | | 53/502 |
| 4,216,617 A * | 8/1980 | Schmidt | A01G 31/06 |
| | | | 47/62 A |
| 4,276,976 A * | 7/1981 | Dunstan | B66B 21/12 |
| | | | 198/792 |
| 4,454,684 A | 6/1984 | O'Hare | |
| 4,574,520 A * | 3/1986 | Arledge | A01G 31/06 |
| | | | 47/59 R |
| 4,944,387 A * | 7/1990 | Burke | A01D 46/28 |
| | | | 198/708 |
| 4,965,962 A | 10/1990 | Akagi | |
| 5,502,923 A | 4/1996 | Bradshaw | |
| 5,526,921 A * | 6/1996 | Kovalak | B65G 47/58 |
| | | | 198/708 |
| 5,526,922 A * | 6/1996 | Clark | B65G 17/126 |
| | | | 198/708 |
| 5,533,302 A * | 7/1996 | Lynch | A01G 9/023 |
| | | | 47/66.5 |
| 5,555,676 A | 9/1996 | Lund | |
| 5,617,673 A | 4/1997 | Takashima | |
| 5,862,628 A | 1/1999 | Takashima | |
| 6,061,957 A | 5/2000 | Takashima | |
| 6,470,625 B1 * | 10/2002 | Byun | A01G 9/023 |
| | | | 47/82 |
| 6,840,008 B1 * | 1/2005 | Bullock | A01G 9/023 |
| | | | 47/82 |
| 7,049,743 B2 | 5/2006 | Uchiyama | |
| 7,243,460 B2 | 7/2007 | Darlington | |
| 7,415,796 B2 | 8/2008 | Brusatore | |
| 7,533,493 B2 | 5/2009 | Brusatore | |
| 7,536,827 B2 | 5/2009 | Busch et al. | |
| 7,559,173 B2 | 7/2009 | Brusatore | |
| 7,785,207 B2 | 8/2010 | Henry et al. | |
| 7,921,601 B2 | 4/2011 | Henry et al. | |
| 8,074,398 B2 | 12/2011 | Hazan | |
| 8,122,642 B1 | 2/2012 | Huberman et al. | |
| 8,141,294 B2 | 3/2012 | Bribach et al. | |
| 8,151,518 B2 | 4/2012 | Adams et al. | |
| 8,234,813 B2 | 8/2012 | Busch et al. | |
| 8,250,808 B2 | 8/2012 | Kania et al. | |
| 8,250,809 B2 | 8/2012 | Simmons | |
| 8,327,579 B2 | 12/2012 | Kania et al. | |
| 8,327,582 B2 | 12/2012 | Storey | |
| 8,627,598 B1 | 1/2014 | Souder et al. | |
| 8,689,485 B2 | 4/2014 | Friedman | |
| 8,756,862 B1 | 6/2014 | Huberman et al. | |
| 9,043,962 B2 | 6/2015 | Trofe | |
| 9,282,699 B2 | 3/2016 | Anderson et al. | |
| 9,357,715 B2 | 6/2016 | Cottrell | |
| 9,359,759 B2 | 6/2016 | Otamendi | |
| 9,374,952 B1 | 6/2016 | Cross | |
| 9,380,751 B2 | 7/2016 | Storey | |
| 9,445,557 B2 | 9/2016 | Darlington | |
| 9,468,154 B2 | 10/2016 | Carpenter | |
| 9,474,217 B2 | 10/2016 | Anderson et al. | |
| 9,491,915 B2 | 11/2016 | Storey | |
| 9,510,524 B2 | 12/2016 | Anderson et al. | |
| 9,591,814 B2 | 3/2017 | Collins et al. | |
| 9,730,400 B2 | 8/2017 | Wilson et al. | |
| 9,814,186 B2 | 11/2017 | Anderson et al. | |
| 9,854,750 B2 | 1/2018 | Brusatore | |
| 9,924,639 B1 | 3/2018 | Arrighi | |
| 9,974,243 B2 | 5/2018 | Martin | |
| 10,022,873 B2 | 7/2018 | Larrea-Tamayo et al. | |
| 10,136,587 B1 | 11/2018 | Johnson | |
| 10,421,618 B2 | 9/2019 | Millar | |
| 10,575,478 B2 * | 3/2020 | Stolzfus | A01G 31/06 |
| 10,716,265 B2 | 7/2020 | Alexander | |
| 10,939,623 B2 | 3/2021 | Miyahara | |
| 11,202,418 B2 | 12/2021 | Friedman | |
| 2004/0103583 A1 | 6/2004 | Eriksen et al. | |
| 2005/0268547 A1 | 12/2005 | Uchiyama | |
| 2006/0162252 A1 | 7/2006 | Lim | |
| 2006/0201058 A1 | 9/2006 | Ripatti | |
| 2007/0033866 A1 | 2/2007 | Henry et al. | |
| 2007/0033867 A1 | 2/2007 | Henry et al. | |
| 2007/0051036 A1 | 3/2007 | Henry et al. | |
| 2007/0051037 A1 | 3/2007 | Henry et al. | |
| 2007/0051038 A1 | 3/2007 | Henry et al. | |
| 2008/0086942 A1 | 4/2008 | Maier | |
| 2009/0139927 A1 | 6/2009 | Kania et al. | |
| 2009/0223126 A1 | 9/2009 | Garner et al. | |
| 2011/0005132 A1 | 1/2011 | Kania et al. | |
| 2011/0005133 A1 | 1/2011 | Kania et al. | |
| 2011/0005134 A1 | 1/2011 | Kania et al. | |
| 2011/0005444 A1 | 1/2011 | Kania et al. | |
| 2011/0005446 A1 | 1/2011 | Kania et al. | |
| 2011/0005447 A1 | 1/2011 | Kania et al. | |
| 2011/0005449 A1 | 1/2011 | Kania et al. | |
| 2011/0131876 A1 | 6/2011 | Pettibone | |
| 2011/0146559 A1 | 6/2011 | Kania et al. | |
| 2011/0258925 A1 | 10/2011 | Baker | |
| 2012/0167460 A1 | 7/2012 | Omidi | |
| 2012/0279122 A1 | 11/2012 | Benne et al. | |
| 2012/0285084 A1 | 11/2012 | Hu | |
| 2013/0019527 A1 | 1/2013 | Howe-Sylvain | |
| 2013/0067814 A1 | 3/2013 | Riley et al. | |
| 2013/0298462 A1 | 11/2013 | Moran | |
| 2014/0000162 A1 | 1/2014 | Blank | |
| 2014/0115958 A1 | 5/2014 | Helene | |
| 2014/0137472 A1 | 5/2014 | Anderson et al. | |
| 2014/0223816 A1 | 8/2014 | Parker | |
| 2014/0259904 A1 | 9/2014 | Collard | |
| 2014/0318010 A1 | 10/2014 | Tomlinson | |
| 2014/0366443 A1 | 12/2014 | Brusatore | |
| 2015/0027051 A1 | 1/2015 | Anderson et al. | |
| 2015/0196949 A1 | 7/2015 | Manuszak | |
| 2015/0230419 A1 | 8/2015 | Ishizaka et al. | |
| 2015/0334930 A1 | 11/2015 | Stoltzfus | |
| 2015/0351329 A1 | 12/2015 | Heidl et al. | |
| 2016/0000018 A1 | 1/2016 | Elmpt et al. | |
| 2016/0073589 A1 | 3/2016 | McNamara et al. | |
| 2016/0135393 A1 | 5/2016 | Ruanova | |
| 2016/0135398 A1 | 5/2016 | Mathieu et al. | |
| 2016/0192594 A1 | 7/2016 | Mawendra | |
| 2016/0212946 A1 | 7/2016 | Higgins | |
| 2016/0227722 A1 | 8/2016 | Storey | |
| 2016/0235025 A1 | 8/2016 | Bray | |
| 2016/0270304 A1 | 9/2016 | Higgins | |
| 2017/0000038 A1 | 1/2017 | Collard | |
| 2017/0013810 A1 | 1/2017 | Grabell et al. | |
| 2017/0020082 A1 | 1/2017 | Storey | |
| 2017/0027119 A1 | 2/2017 | Storey | |
| 2017/0055460 A1 | 3/2017 | Brusatore | |
| 2017/0055461 A1 | 3/2017 | Neuhoff, Jr. et al. | |
| 2017/0055474 A1 | 3/2017 | Storey | |
| 2017/0064912 A1 | 3/2017 | Tabakman | |
| 2017/0086399 A1 | 3/2017 | Anderson et al. | |
| 2017/0181393 A1 | 6/2017 | Nelson | |
| 2017/0202162 A1 | 7/2017 | Dufresne et al. | |
| 2017/0231167 A1 | 8/2017 | Storey | |
| 2017/0231168 A1 | 8/2017 | Storey | |
| 2017/0303484 A1 | 10/2017 | Wilson et al. | |
| 2017/0303485 A1 | 10/2017 | Wilson et al. | |
| 2017/0339841 A1 | 11/2017 | Monasterio | |
| 2017/0347537 A1 | 12/2017 | Beaulieu | |
| 2018/0007850 A1 | 1/2018 | Dufresne et al. | |
| 2018/0014471 A1 | 1/2018 | Jensen et al. | |
| 2018/0014485 A1 | 1/2018 | Whitcher et al. | |
| 2018/0014486 A1 | 1/2018 | Creechley et al. | |
| 2018/0042186 A1 | 2/2018 | Kop | |
| 2018/0077884 A1 | 3/2018 | Barker et al. | |

(56) References Cited

U.S. PATENT DOCUMENTS

| | | | |
|---|---|---|---|
| 2018/0084713 A1 | 3/2018 | Ito et al. | |
| 2018/0084739 A1 | 3/2018 | Bottari | |
| 2018/0098513 A1 | 4/2018 | Ritchie | |
| 2018/0098515 A1 | 4/2018 | Anderson et al. | |
| 2018/0146618 A1 | 5/2018 | Elazary et al. | |
| 2018/0153113 A1 | 6/2018 | Storey et al. | |
| 2018/0153115 A1 | 6/2018 | Edke et al. | |
| 2018/0168108 A1 | 6/2018 | Foreman et al. | |
| 2018/0206414 A1 | 7/2018 | Goodman et al. | |
| 2018/0310489 A1 | 11/2018 | Roeser | |
| 2020/0008378 A1 | 1/2020 | Van Buuren | |
| 2020/0367455 A1 | 11/2020 | Vesty | |
| 2021/0000022 A1* | 1/2021 | Coffin | A01G 9/023 |
| 2022/0046875 A1* | 2/2022 | Clemmer | A01G 31/042 |

FOREIGN PATENT DOCUMENTS

| | | | |
|---|---|---|---|
| JP | H0614663 A | 1/1994 | |
| WO | 2017205420 A1 | 11/2017 | |
| WO | 2017217130 A1 | 12/2017 | |
| WO | 2018037577 A1 | 3/2018 | |
| WO | 2018175794 A1 | 9/2018 | |
| WO | 2019183244 A2 | 9/2019 | |
| WO | WO-2020092503 A1 * | 5/2020 | A01D 45/00 |

* cited by examiner

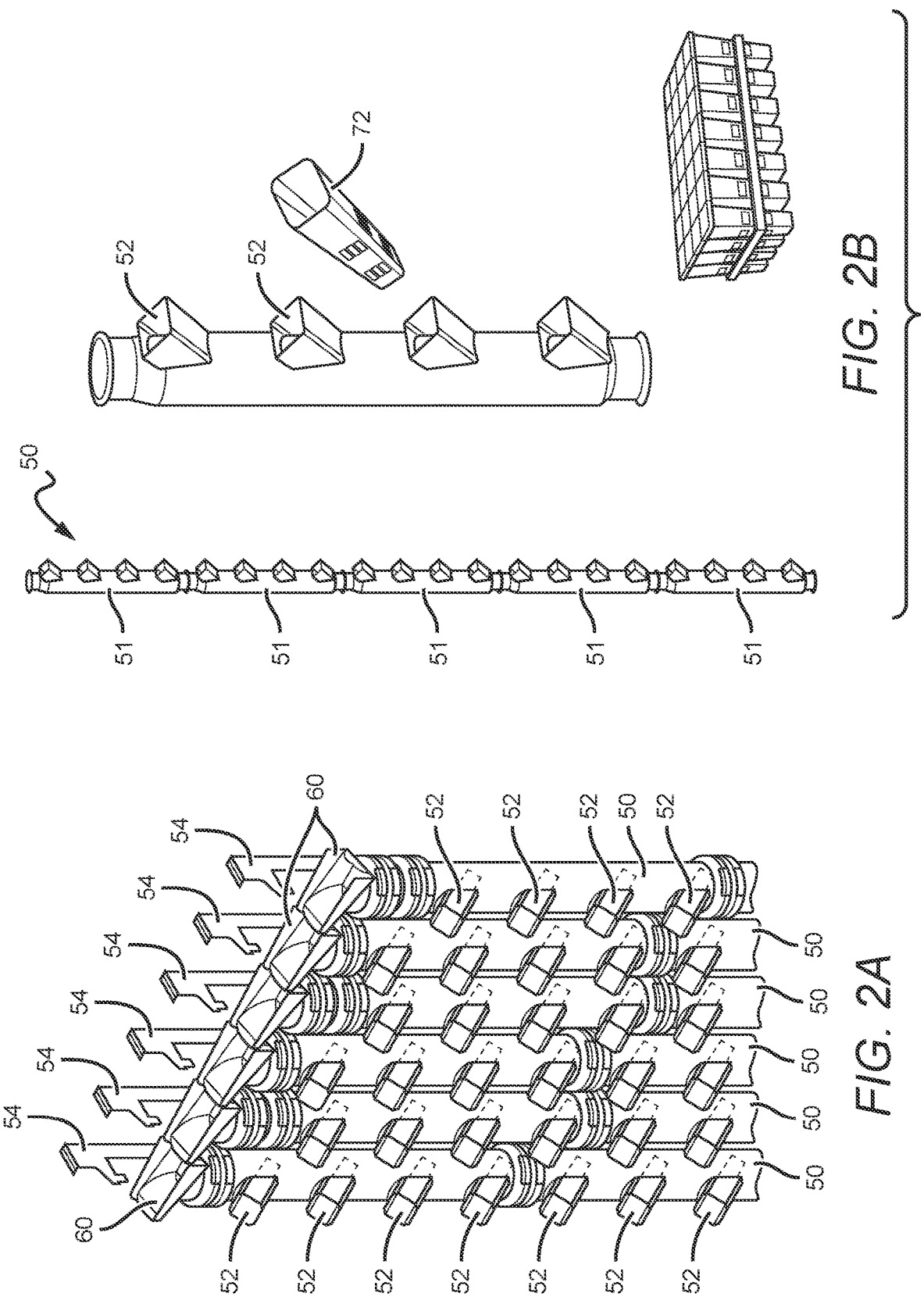

GROW TOWERS WITH OVERLAPPING FUNNELS FOR AUTOMATED AGRICULTURE PRODUCTION

CROSS-REFERENCE TO RELATED APPLICATIONS

The present application claims priority to U.S. provisional application Ser. No. 63/083,753 filed Sep. 25, 2020, which is incorporated herein by reference for all purposes.

FIELD OF THE DISCLOSURE

The disclosure relates generally to the field of controlled-environment agriculture, and in particular to an automated farm production system including a plurality of grow towers having overlapping funnels.

BACKGROUND

During the twentieth century, agriculture slowly began to evolve from a conservative industry to a fast-moving high-tech industry in order to keep up with world food shortages, climate change and societal changes. Farming began to move away from manually-implemented agriculture techniques toward computer-implemented technologies. In the past, and in many cases still today, farmers only had one growing season to produce the crops that would determine their revenue and food production for the entire year. However, this is changing. With indoor growing as an option and with better access to data processing technologies, among other advanced techniques, the science of agriculture has become more agile. It is adapting and learning as new data is collected and insights are generated.

Advancements in technology are making it feasible to control the effects of nature with the advent of "controlled indoor agriculture" or "controlled-environment agriculture." Improved efficiencies in space utilization, lighting, and a better understanding of hydroponics, aeroponics, crop cycles, and advancements in environmental control systems have allowed humans to better recreate environments conducive for agriculture crop growth with the goals of greater yields per square foot, better nutrition and lower cost.

US Patent Publication Nos. 2018/0014485 and 2018/0014486, both assigned to the assignee of the present disclosure and incorporated by reference in their entirety herein, describe environmentally controlled vertical farming systems. The vertical farming structure (e.g., a vertical column) may be moved about an automated conveyance system in an open or closed-loop fashion, exposed to precision-controlled lighting, airflow and humidity, with ideal nutritional support.

US Patent Pub. No. US 2017/0055460 ("Brusatore") describes a system for continuous automated growing of plants. A vertical array of plant supporting arms extends radially from a central axis. Each arm includes pot receptacles which receive the plant seedling, and liquid nutrients and water. The potting arms are rotated beneath grow lamps and pollinating arms. However, the spacing between plants appears to be fixed.

U.S. Pat. No. 2,244,677 to Cornell describes a plant production system that conveys vertical box-shaped frame within a greenhouse structure. A chain-drive mechanism conveys the vertical box-like frames in a track where they are exposed to controlled environmental conditions. Cornell, however, does not contemplate a plant production system that includes multiple grow zones with different environmental conditions and a conveyance system that conveys plants through the zones during a growing cycle.

SUMMARY OF THE DISCLOSURE

Embodiments of the disclosure are directed to controlled environment agriculture system that operates in connection with grow towers having overlapping funnels. The use of overlapping funnels functionally de-couples irrigation processes from tower conveyance. This allows, for example, grow towers to be moved for harvesting or other operations without affecting the timing of irrigation. This configuration provides several advantages. For example, certain crop types, such as strawberries, may reside in a growth chamber for many days and harvested many times during its life cycle. The configurations set forth below allow towers containing such crops to be moved to a harvesting location without turning off irrigation.

BRIEF DESCRIPTION OF THE DRAWINGS

FIG. 2A is a partial perspective view of grow towers including funnels arranged in an overlapping configuration; FIG. 2B illustrates an example grow tower.

DETAILED DESCRIPTION

The present description is made with reference to the accompanying drawings, in which various example embodiments are shown. However, many different example embodiments may be used, and thus the description should not be construed as limited to the example embodiments set forth herein. Rather, these example embodiments are provided so that this disclosure will be thorough and complete. Various modifications to the exemplary embodiments will be readily apparent to those skilled in the art, and the generic principles defined herein may be applied to other embodiments and applications without departing from the spirit and scope of the disclosure. Thus, this disclosure is not intended to be limited to the disclosed embodiments, but is to be accorded the widest scope consistent with the claims and the principles and features disclosed herein.

The present disclosure describes a controlled-environment agriculture system having a plurality of grow towers attached to and conveyed by an automated grow tower conveyance mechanism. An irrigation system supplies aqueous nutrient solution to the tops of the grow towers. Gravity causes the solution to travel down the inner cavity of the towers to irrigate plant or grow sites located along the towers. A gutter may collect excess nutrient solution exiting the bottom of the towers. In the examples shown, the grow towers each include tower funnels attached at the top of the towers. Each tower funnel includes a collector configured to overlap with tower funnels of adjacent grow towers. This configuration de-couples irrigation from tower conveyance. In particular, this configuration allows for towers to be irrigated while also being conveyed by the automated grow tower conveyance mechanism. Embodiments of the disclosure can be implemented in a vertical farm production system that includes grow towers as described herein. However, the present invention is not limited to any particular grow tower. For example, the grow towers may include grow sites along a single face or multiple faces, such as the grow towers disclosed in U.S. Patent No. PCT/US19/058764, which is incorporated by reference herein.

Figure 1:
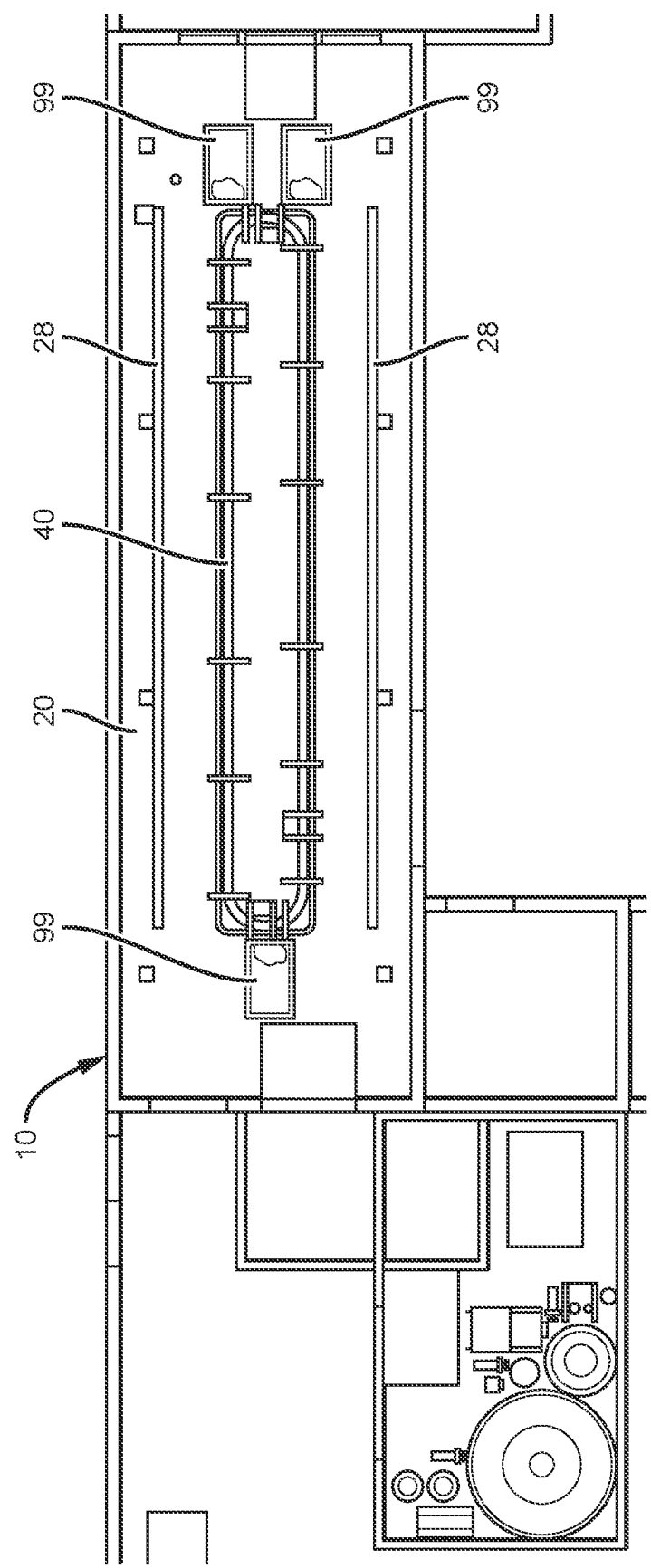
FIG. 1 is a functional diagram illustrating an example controlled environment agriculture system.

FIG. 1 is a functional block diagram illustrating an example controlled environment agriculture system 10. At a high level, the system 10 may include an environmentally-controlled growing chamber 20 including a plurality of grow towers 50 attached to a tower conveyance system 40. In the implementation shown, tower conveyance system 40 conveys grow towers 50 around a travel path that includes one or more harvesting stations 99 where robots or humans can harvest crop grown on the grow sites of a grow tower 50. Not shown are systems for extracting grow towers 50 from chamber 20 or for injecting grow towers 50 into chamber 20. For didactic purposes, one implementation of the system is described in connection with a farm system that employs vertical grow towers. In one implementation, the grow containers may be vertical grow towers including grow sites along one or more faces of each tower, as disclosed in International Application Serial No. PCT/US19/058764, which is incorporated by reference herein for all purposes. The crops or plants species that may be grown may be gravitropic/geotropic and/or phototropic, or some combination thereof. The crops or plant species may vary considerably and include various leaf vegetables, fruiting vegetables, flowering crops, fruits and the like. The controlled environment agriculture system 10 may be configured to grow a single crop type at a time or to grow multiple crop types concurrently. Other implementations are possible. For example, while the systems illustrated in FIGS. 1 and 3 disclose a system that operates as a loop, the invention can be applied to a linear system.

Growth chamber 20 may include environmental control systems, and associated sensors, for regulating at least one environmental condition, such as air temperature, airflow speed, relative air humidity, and ambient carbon dioxide gas content. The control systems may, for example, include such sub-systems as HVAC units, chillers, fans and associated ducting and air handling equipment. The controlled environment agriculture system 10 may include corresponding sensors and programming logic for tracking the grow towers 50 and the plants located therein during various stages of the farm production cycle and/or for controlling one or more conditions of the growth chamber 20. The operation of control system and the length of time towers remain in chamber 20 can vary considerably depending on a variety of factors, such as crop type and other factors. For example, grow towers 50 containing strawberries can remain in chamber 20 for hundreds of days. The control system is capable of automated adjustments to optimize growing conditions within the growth chamber 20 to make continuous improvements to various attributes, such as crop yields, visual appeal and nutrient content. In addition, US Patent Publication Nos. 2018/0014485 and 2018/0014486 describe application of machine learning and other operations to optimize grow conditions in a farming system. In some implementations, environmental condition sensors may be disposed proximal to the towers or at various locations in growth chamber 20. When crops are ready for harvesting, tower conveyance mechanism 40 may convey grow towers 50 to be harvested to harvesting station 99 for harvesting and other processing operations. In other implementations, the grow towers 60 may be transferred out of chamber 20 for harvesting. As discussed in International Application Serial No. PCT/US19/058764 (the entire disclosure of which is incorporated by reference herein for all purposes), a central processing system may include one or more conveyance mechanisms for directing grow towers 50 to stations in the central processing system—e.g., stations for loading plants into, and harvesting crops from, the grow towers 50.

Growth chamber 20 may include light emitting sources 28 positioned at various locations between and along the grow path defined by tower conveyance mechanism 40. The light emitting sources can be positioned laterally relative to the grow towers 50. For example, the light emitting sources may be configured to emit light toward the lateral faces of grow towers that include openings from which crops grow. The light emitting sources may be incorporated into a water-cooled, LED lighting system as described in U.S. Publ. No. 2017/0146226A1, the disclosure of which is incorporated by reference herein. In such an embodiment, the LED lights may be arranged in a bar-like structure. The bar-like structure may be placed in a vertical orientation to emit light laterally to substantially the entire length of adjacent grow towers. Multiple light bar structures may be arranged in chamber 20 along grow path. Other lighting systems and configurations may be employed. For example, the light emitting elements may be arranged in a grid-like or matrix structure running along the grow path.

The system 10 may also include an irrigation system configured to supply an aqueous nutrient solution to the crops as they translate through chamber 20. In implementations using grow towers 50, the nutrient supply system may apply aqueous crop nutrient solution to the top of the grow towers. Gravity may cause the solution to travel down the vertically-oriented grow towers 50 and through the length thereof to supply solution to the crop sites disposed along the length of the grow tower 50. The growth environment 20 may also include an airflow source configured to, when a tower is mounted to conveyance mechanism 40, direct airflow in the lateral growth direction of growth and through an under-canopy of the growing plant, so as to disturb the boundary layer of the under-canopy of the growing plant. In other implementations, airflow may come from the top of the canopy or orthogonal to the direction of plant growth.

Figure 2C:
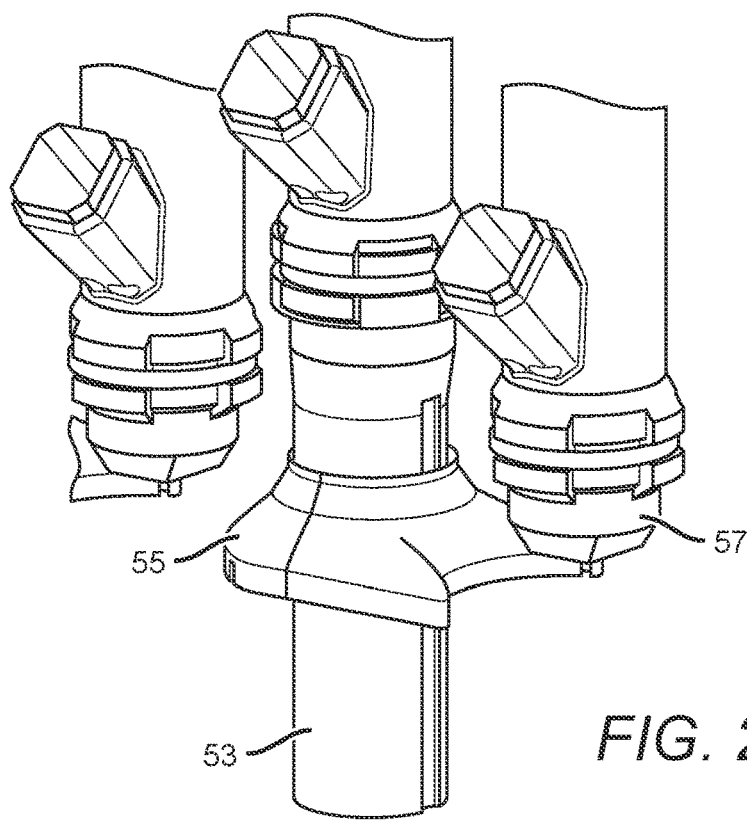
FIG. 2C shows the bottom portion of an example grow tower.

FIG. 2A illustrates a set of grow towers 50 according to one implementation of the invention. Each grow tower 50 is configured for containing plant growth media that supports a root structure of at least one crop plant growing therein. Each grow tower 50 is also configured to releasably attach to a grow conveyance mechanism 40 in a vertical orientation and move along a travel path within growth environment 20. In the implementation shown, a grow tower 50 comprises a plurality of grow sites 52 extending along the length thereof and a tower funnel 60 attached to the top of the grow tower 50. As FIG. 2B illustrates, in one implementation, each grow site 52 may be configured to accept a plug container 72 that contains a root plug of a crop to be grown. The root plug may be held within the inner cavity defined by grow tower 50 such that it is in the path of aqueous nutrient solution trickling down from funnel 60 to thereby irrigate the root plug. FIG. 2B also illustrates how a grow tower 50 can be assembled from a plurality of individual tower sections 51. As FIG. 2C illustrates, each tower section 51 may include concentrator 57 which provides a narrow outlet for excess nutrient solution to focus the solution to grow sites 52 associated with a lower section 51 of the tower 50. Excess nutrient solution exits through the bottom of a grow tower 50 where it may be collected by a gutter (not shown). As FIG. 2C also illustrates, a grow tower 50 may also include a bottom section 53 that engages a gutter and a shield 55 that, in combination with other shields of the other grow towers, shields the gutter from light or debris (reducing the possibility of algae growing in the gutter). International Application Serial No. PCT/US19/058764 and U.S. application Ser. No. 16/893,833 describe how plants contained grow towers 50 may be irrigated. These applications also illustrate different tower configurations, such as dual-side towers, that could be used in the present invention.

Figure 3:
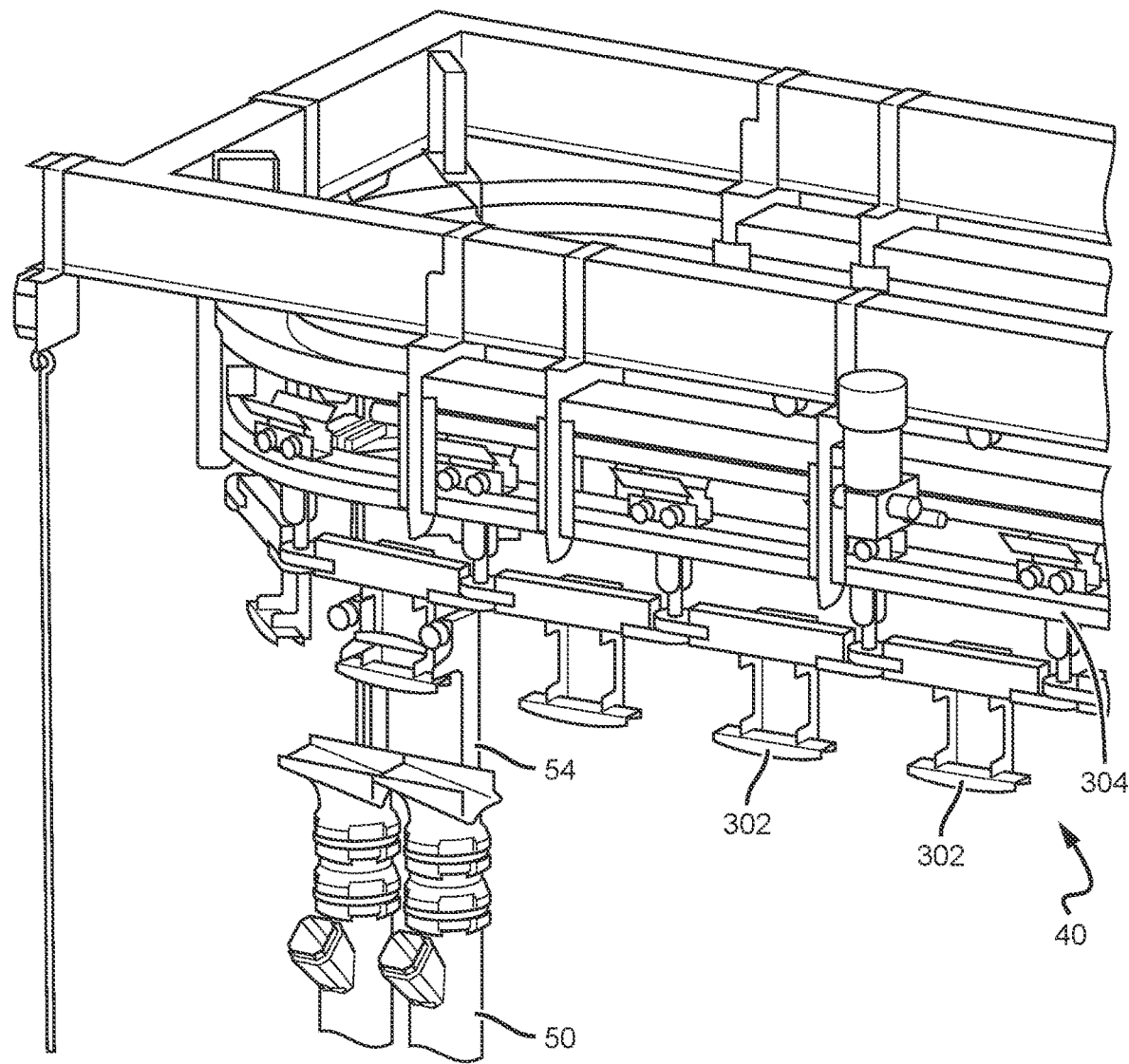
FIG. 3 is a partial perspective view of a grow tower conveyance system.

As FIG. 3 illustrates, a tower hook 54 attaches the grow tower 50 to the conveyance mechanism 40. In one implementation, conveyance mechanism 40 may comprise a power-and-free conveyor to move grow towers 50 along a travel path within environment 20; however, other mechanisms, such as that illustrated in FIG. 3 can also be used to convey grow towers 50. As FIG. 3 further illustrates, the conveyance mechanism 40 may include a plurality of trolleys 302 disposed on a track 304 that defines the travel path for the grow towers 50 within chamber 20. In the implementation shown, each trolley 302 can accommodate two grow towers 50. In other implementations, each trolley 302 can accommodate a lesser or greater number of grow towers 50. The irrigation system may include one or more irrigation lines with apertures or nozzles that supply nutrient solution at various locations along the irrigation lines. The irrigation lines may be disposed along the travel path defined by track 304 and located over the funnels 60 of the grow towers 50.

Figure 4:
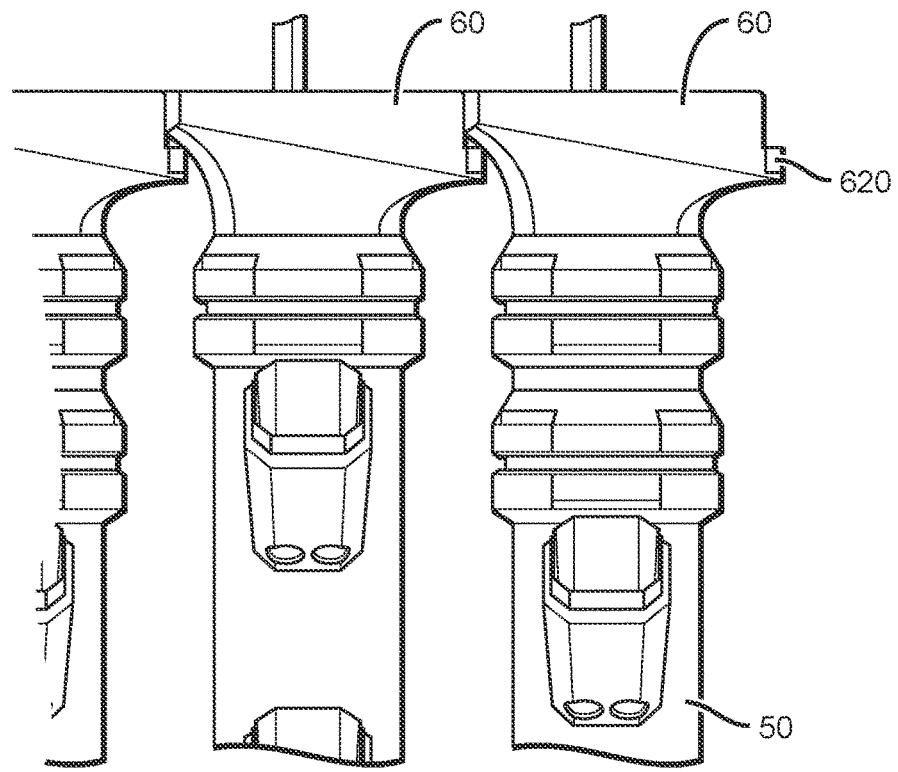
FIG. 4 is a partial plan view illustrating how funnels of grow towers overlap when installed in a conveyance system.
Figure 5:
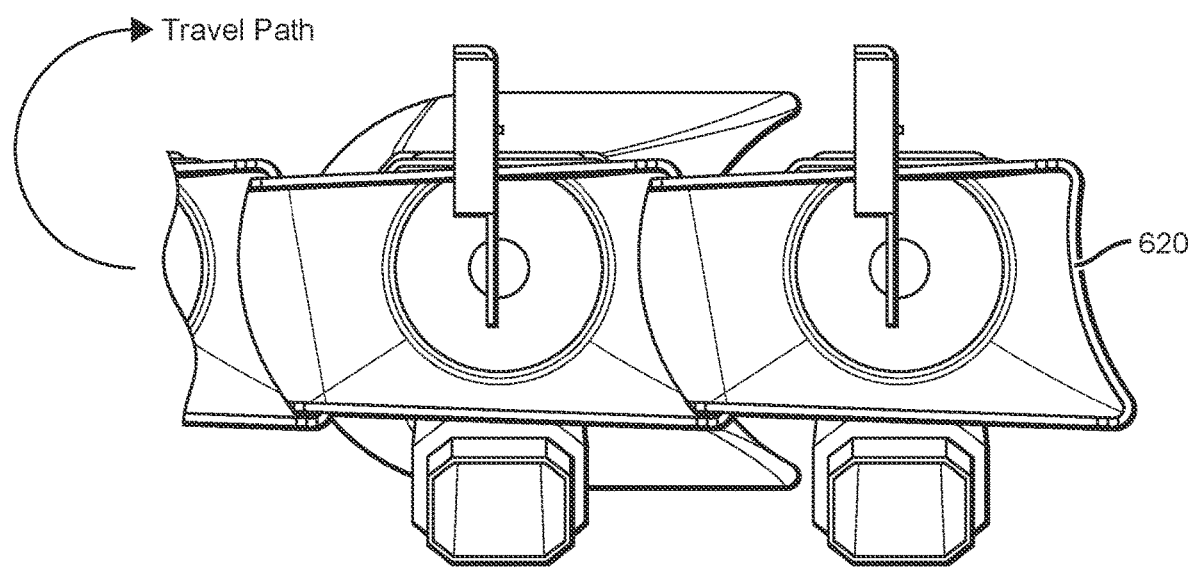
FIG. 5 is a partial top view illustrating how funnels of grow towers overlap when installed in a conveyance system
Figure 6A:
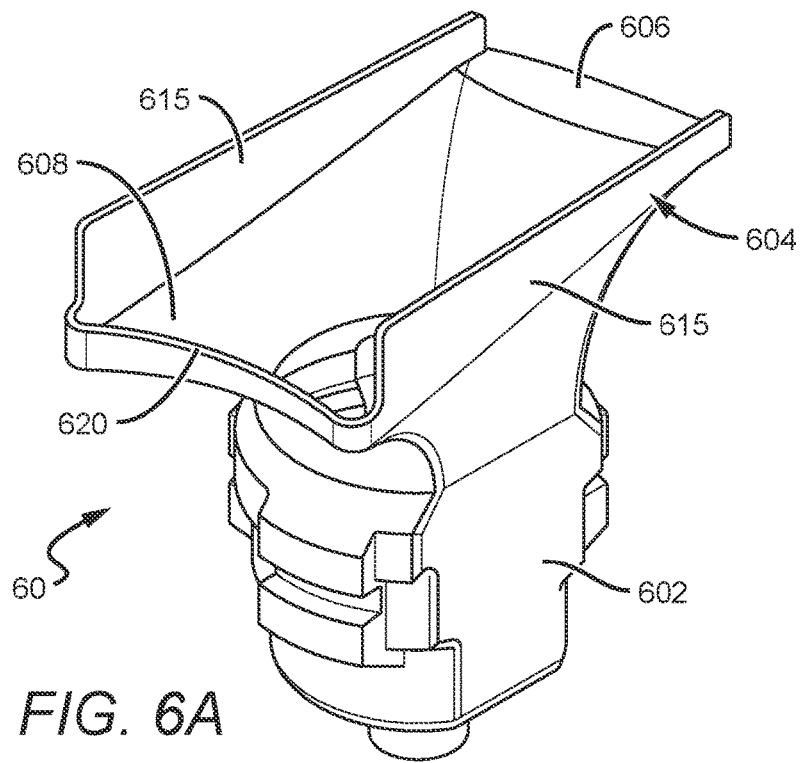
FIG. 6A is a perspective view of an example tower funnel.
Figure 6B:
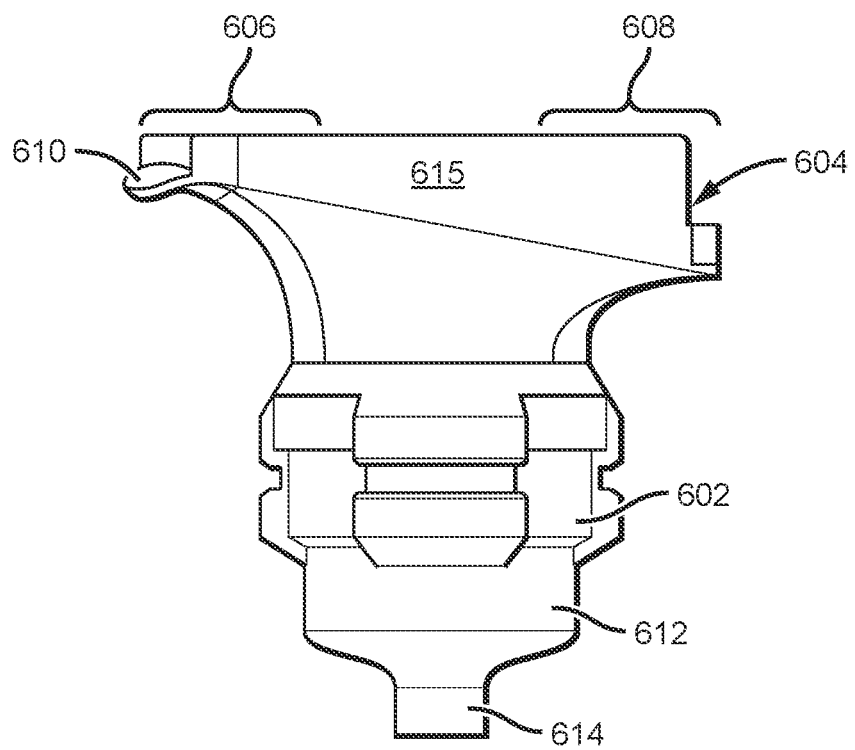
FIG. 6B is a front elevation view of the example tower funnel.
Figure 6C:
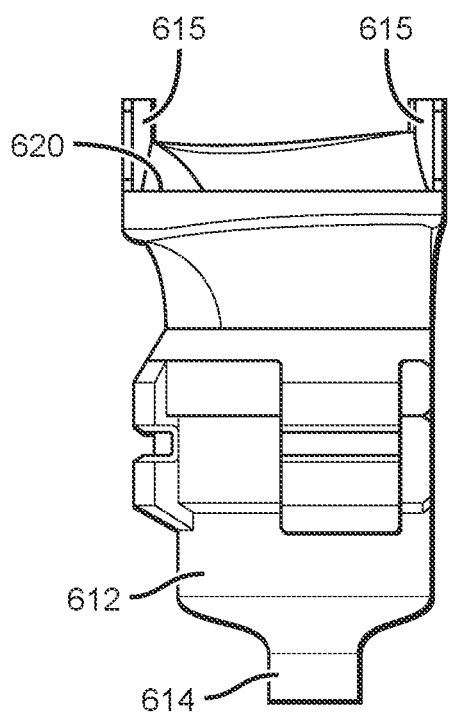
FIG. 6C is a right side elevation view of the example tower funnel.
Figure 6D:
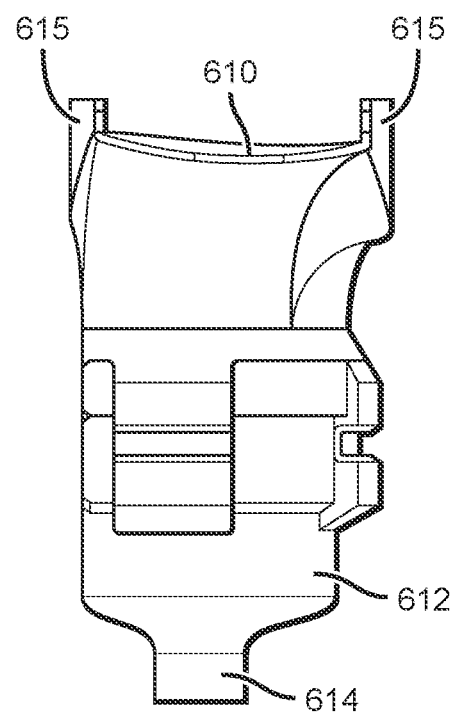
FIG. 6D is a left side elevation view of the example tower funnel.

FIGS. 4 and 5 illustrates in more detail how funnels 60 of adjacent grow towers 50 overlap to define a contiguous reception area for aqueous solution supplied by the irrigation system. A FIGS. 6A and 6B illustrate, each funnel 60 comprises a main body section 602 that attaches to the body of the grow tower 50. In the implementation shown, section 612 of funnel 60 fits inside the cavity defined by the tower body and includes outlet section 614 that focuses nutrient solution flow over a desired region within the tower body. Funnel 60 also includes a collector structure 604. As FIGS. 6A and 6B show, collector 604 extends from main body section 602 to collect solution and ultimately channel it to outlet 614. Outlet 614 and section 612, as well as main body generally, are substantially circular in profile along the x-y plane. A z-axis can be defined relative to the central axis of the outlet 614. As FIG. 6A illustrates, collector 604 comprises over-extension portion 606 and under-extension portion 608 extending opposite to over-extension portion 606. Collector 604 extends upwardly from main body 602 along the z- or central axis to define an upper edge defined by side walls 615. When a corresponding grow tower 50 is attached to conveyance mechanism 50, the over-extension portion 606 is configured to extend above the under-extension portion of a first adjacent grow tower. In other words, the over-extension portion 606 extends generally along a plane that is higher than the under-extension portion 608. Conversely, the under-extension portion 608 of funnel 60 is configured to underlie the over-extension portion of a second adjacent grow tower disposed opposite to the first adjacent grow tower. In other words, the upper lip section 610 lies above the rim section relative to the central or z-axis defined by the main body 602. In the particular implementation shown, under-extension portion 608 includes a cutout defining a rim section 620 that extends under a lip section of an adjacent funnel. Conversely, over-extension portion 606 includes lip section 610 that extends past the rim section 620 (and over the under-extension portion 608) of an adjacent funnel. In this manner, the funnels 60 collectively achieve a contiguous collection path for aqueous nutrient solution emitted by the irrigation system regardless of the exact locations of the grow towers or whether the grow towers are in motion or not. In the implementation shown, collector 604 also includes side walls 615 extending along the lateral sides of collector 604 between the respective outer ends of over-extension portion 606 and under-extension portion 608.

Figure 6E:
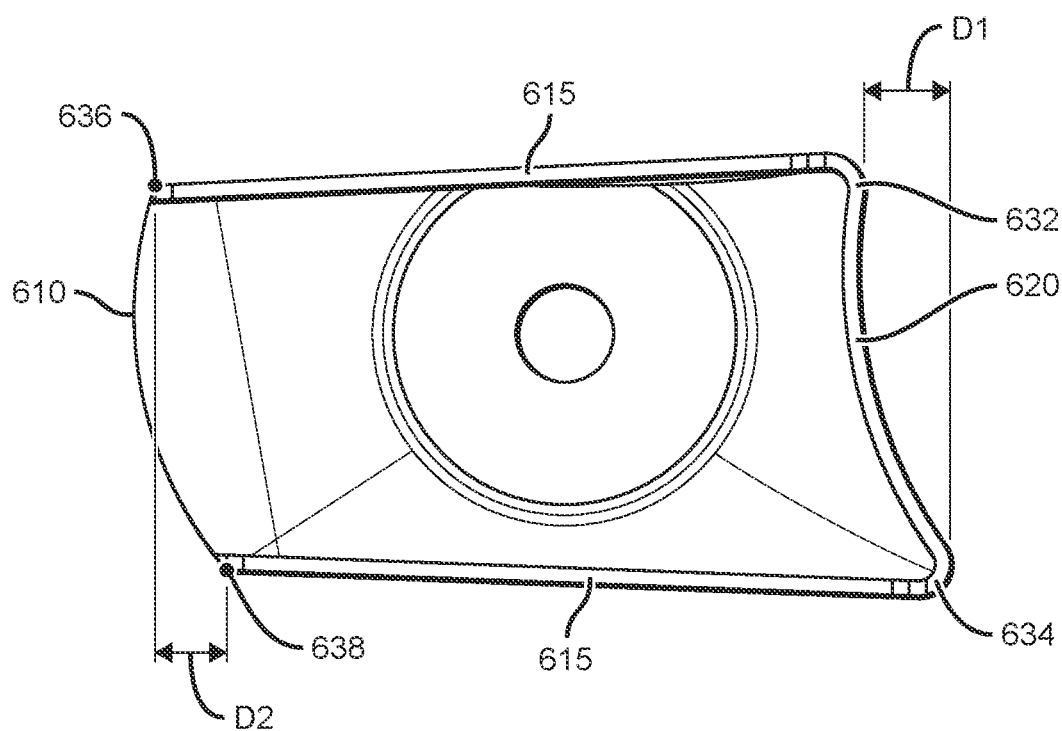
FIG. 6E is a top view of the example tower funnel.
Figure 6F:
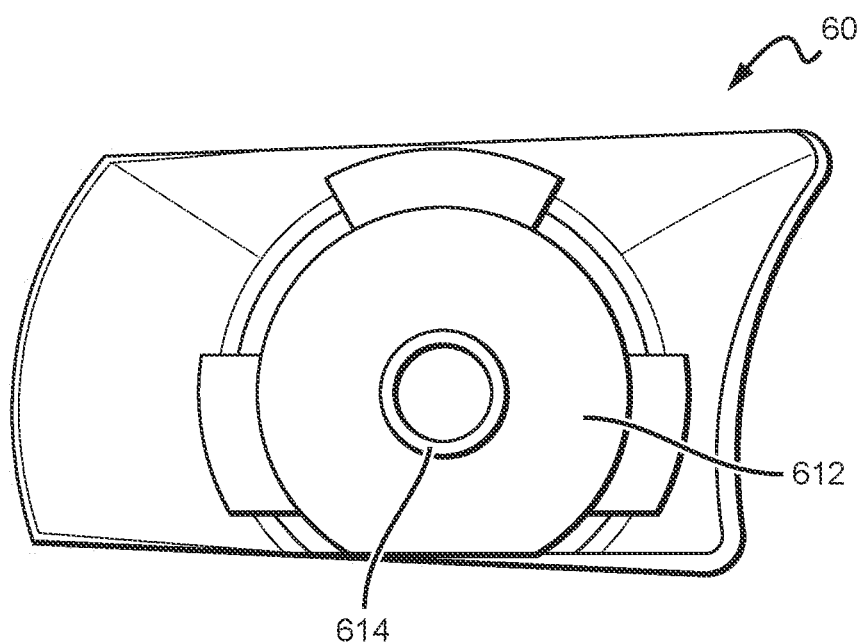
FIG. 6F is a bottom view of the example tower funnel.

One or more aspects or features of over-extension portion 606 and/or under-extension portion can be configured or modified to achieve different objectives or advantages. For example as the various Figures show, the overall top profile of collector 604 resembles a parallelogram to facilitate use of the funnels in connection with a curved travel path. In the implementation shown, lip section 610 slopes downwardly as it extends outwardly over the under-extension portion of an adjacent funnel. This slope reduces the chance that surface tension would cause nutrient solution to adhere to the outer surface of the funnel 60 and not fall into the collector of the adjacent funnel. As FIG. 6E illustrates, the profile of rim section 620 is curved inwardly. This curve profile is bounded by endpoints 632 and 634. Relative to the axis defined by outlet 614 or main body 612, endpoint 634 extends further along a first axis by a dimension D1. Similarly, lip section 610 has an outwardly curved profile. As FIG. 6E shows, this curved profile is defined by endpoints 636 and 638. Relative to the axis defined by outlet 614 or main body 612, endpoint 636 extends further along a first axis by a dimension D2. This overall configuration allows the funnels to maintain the contiguous collection pathway at the curved sections of track 304, where adjacent funnels are rotated at an angle relative to each other. With reference to FIG. 5, for example, the configuration discussed above allows funnels to overlap while traveling along a path that rotates clockwise (initially leftward and upward and then rightward) relative to the view illustrated.

Additional operational and configuration details of an example farm system environment in which implementations can be used are set forth in International Application Serial Nos. PCT/US19/023201 and PCT/US19/058770, which are incorporated by reference herein for all purposes. In addition, while certain implementations are described as operating in connection with vertical grow towers, other implementations can be configured to detect anomalies in farm systems employ other grow structures, such as horizontal trays stacked in vertical configurations, and the like.

Although the disclosure may not expressly disclose that some embodiments or features described herein may be combined with other embodiments or features described herein, this disclosure should be read to describe any such combinations that would be practicable by one of ordinary skill in the art. Unless otherwise indicated herein, the term "include" shall mean "include, without limitation," and the term "or" shall mean non-exclusive "or" in the manner of "and/or."

Those skilled in the art will recognize that, in some embodiments, some of the operations described herein may be performed by human implementation, or through a combination of automated and manual means. When an operation is not fully automated, appropriate components of embodiments of the disclosure may, for example, receive the results of human performance of the operations rather than generate results through its own operational capabilities.

All references, articles, publications, patents, patent publications, and patent applications cited herein are incorporated by reference in their entireties for all purposes to the extent they are not inconsistent with embodiments of the disclosure expressly described herein. However, mention of any reference, article, publication, patent, patent publication, and patent application cited herein is not, and should not be taken as an acknowledgment or any form of suggestion that they constitute valid prior art or form part of the common general knowledge in any country in the world, or that they are disclose essential matter.

What is claimed is:

1. An agriculture production system, comprising
   a plurality of grow towers;
   a tower conveyance system operative to convey the plurality of grow towers along a travel path;
   wherein each of the grow towers comprises:
      a tower body comprising a plurality of grow sites;
      a funnel, wherein the funnel comprises a collector extending from a main body attached to a top of the tower body;
      wherein the collector comprises a first over-extension portion and a first under-extension portion extending oppositely from the over-extension portion;
      wherein the first over-extension portion is configured to extend over a second under-extension portion of a first adjacent grow tower of the plurality of grow towers;
      wherein the first under-extension portion is configured to extend under a second over-extension portion of a second adjacent grow tower opposite the first adjacent grow tower;
   an irrigation system operative to supply aqueous solution to the funnels of the plurality of grow towers at one or more points along the travel path.

2. The agriculture production system of claim 1 wherein the first over-extension portion includes a lip edge sloping downwardly.

3. The agriculture production system of claim 1 wherein an outer edge of the first over-extension portion is curved outwardly.

4. The agriculture production system of claim 3 wherein the outer edge comprises a first endpoint and a second endpoint, wherein the first and second endpoints are offset from a center of the main body of the funnel along a first axis at first and second distances, and wherein the first distance is greater than the second distance.

5. The agriculture production system of claim 1 wherein an outer edge of the first under-extension portion is curved inwardly.

6. The agriculture production system of claim 5 wherein the outer edge comprises a first endpoint and a second endpoint, wherein the first and second endpoints are offset from a center of the main body of the funnel along a first axis at first and second distances, and wherein the first distance is less than the second distance.

* * * * *